United States Patent
Takahashi

(10) Patent No.: US 9,385,579 B2
(45) Date of Patent: Jul. 5, 2016

(54) INERTIAL DRIVE ACTUATOR

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 128 days.

(21) Appl. No.: 14/272,937

(22) Filed: May 8, 2014

(65) Prior Publication Data
US 2014/0239747 A1    Aug. 28, 2014

Related U.S. Application Data

(63) Continuation of application No. PCT/JP2012/078583, filed on Nov. 5, 2012.

(30) Foreign Application Priority Data

Nov. 11, 2011    (JP) ................. 2011-247334

(51) Int. Cl.
*H02K 33/18*    (2006.01)
*H02N 2/02*    (2006.01)

(52) U.S. Cl.
CPC ............... *H02K 33/18* (2013.01); *H02N 2/025* (2013.01)

(58) Field of Classification Search
CPC ............................. H02K 33/18; H02N 2/025
USPC ...................................... 74/99 R; 310/15–39
See application file for complete search history.

(56) References Cited

U.S. PATENT DOCUMENTS

| 5,134,335 A | * | 7/1992 | Ikemoto | ............... H02N 2/021 310/323.02 |
| 6,069,420 A | * | 5/2000 | Mizzi | ................. F15B 11/128 310/15 |
| 7,535,661 B2 | | 5/2009 | Matsuki | |

(Continued)

FOREIGN PATENT DOCUMENTS

EP    2 117 057 A2    11/2009
JP    01-138975 A    5/1989

(Continued)

OTHER PUBLICATIONS

Extended Supplementary European Search Report dated Jun. 25, 2016 from related European Application No. 12 84 7484.8.

(Continued)

*Primary Examiner* — Naishadh Desai
(74) *Attorney, Agent, or Firm* — Scully, Scott, Murphy & Presser, P.C.

(57) ABSTRACT

An inertial drive actuator includes a displacement unit, a vibration substrate, a movable body, a first magnetic field generator which generates a magnetic field so that, a magnetic attractive force or a magnetic repulsive force acts in a direction opposite to the movable body, a first yoke, and which induces a magnetic flux generated by the first magnetic field generator such that, the flux generated by the first magnetic field generator is concentrated on a surface of the movable body, opposite to the vibration substrate, and second yokes and on a side of the vibration substrate, opposite to a direction facing the movable body, and the second yokes and control a frictional force acting between the movable body and the vibration substrate by controlling the magnetic field generated by the first magnetic field generator.

11 Claims, 9 Drawing Sheets

(56) References Cited

U.S. PATENT DOCUMENTS

| | | |
|---|---|---|
| 7,986,074 B2 | 7/2011 | Matsuki |
| 2007/0241640 A1 | 10/2007 | Matsuki |
| 2009/0189486 A1 | 7/2009 | Matsuki |
| 2009/0236931 A1* | 9/2009 | Takahashi ............... F03G 7/065 310/306 |
| 2009/0277300 A1* | 11/2009 | Matsuki ............... G01D 5/2412 74/99 R |

FOREIGN PATENT DOCUMENTS

| | | |
|---|---|---|
| JP | 10-257786 A | 9/1998 |
| JP | 2007-288828 A | 11/2007 |
| JP | 2009-177974 A | 8/2009 |
| JP | 2009-273253 A | 11/2009 |

OTHER PUBLICATIONS

Japanese Office Action dated May 7, 2015 from related Japanese Patent Application No. 2011-247334, together with an English language translation.

International Preliminary Report on Patentability together with the Written Opinion dated May 22, 2014 received in related International Application No. PCT/JP2012/078583, together with an English language translation.

International Search Report dated Feb. 5, 2013 issued in PCT/JP2012/078583.

* cited by examiner

INERTIAL DRIVE ACTUATOR

CROSS-REFERENCE TO RELATED APPLICATION

This application is a continuation application of PCT/JP2012/078583 and claims the benefit of priority from the prior Japanese Patent Application No. 2011-247334 filed on Nov. 11, 2011; the entire contents of which are incorporated herein by reference.

BACKGROUND OF THE INVENTION

1. Field of the Invention

The present invention relates to an inertial drive actuator which moves a movable body in a predetermined direction.

2. Description of the Related Art

An actuator which displaces a drive shaft in an axial direction by supplying a saw-tooth wave drive pulse to an electro-mechanical transducer fitted to the drive shaft, and moves a movable member that has been friction-fitted to the drive shaft in the axial direction has been known (hereinafter, such actuator will be called as an 'impact drive actuator' or an 'inertial drive actuator').

Such impact drive actuator has been disclosed in patent literature 1. FIG. 9A is a diagram showing an arrangement thereof. A vibration member 103 is inserted through holes cut through rising portions of a supporting member 101, and is disposed to be movable in an axial direction of the vibration member 103. One end of the vibration member 103 is fixed to one end of a piezoelectric element 102, and the other end of the piezoelectric element 102 is fixed to the supporting member 101.

Therefore, the vibration member 103 vibrates in the axial direction with the vibration of the piezoelectric element 102. Two holes are provided in a movable body 104 as well, and the vibration member 103 is inserted through these two holes. Furthermore, a plate spring 105 is fitted to the movable body 104 from a lower side, and a protrusion provided to the plate spring 105 is pressed against the vibration member 103. Due to pressing by the plate spring 105 in such manner, the movable body 104 and the vibration member 103 are friction-fitted mutually.

A vertical axis V indicates voltage and a horizontal axis T indicates time.

Drive waveforms for driving the impact drive actuator are shown in FIG. 9B and FIG. 9C. FIG. 9B shows a drive waveform for moving the movable body toward right and FIG. 9C shows a drive waveform for moving the movable body toward left. A principle of operation of the impact drive actuator will be described by using these drive waveforms. In the following description, a direction in which, the piezoelectric element 102 elongates is let to be a leftward direction, and a direction in which, the piezoelectric element 102 contracts is let to be a rightward direction.

In a case of moving the movable body 104 in the rightward direction, the drive waveform shown in FIG. 9B is used. The drive waveform has a portion that rises steeply and a portion that falls gently. At the portion where the drive waveform rises steeply, the piezoelectric element 102 is elongated rapidly. Here, since the vibration member 103 is fixed to the piezoelectric element 102, the vibration member 103 moves leftward rapidly with the rapid elongation of the piezoelectric element 102. At this time, as an inertia of the movable body 104 overcomes a friction-fitting force between the movable body 104 and the vibration member 103 (frictional force between the movable body 104 which is pressed by the plate spring 105, and the vibration member 103), the movable body 104 halts at that position without moving in the leftward direction.

Next, at the portion where the drive waveform falls gently, the piezoelectric element 102 contracts gradually. The vibration member 103 moves slowly in the rightward direction with the gradual contraction of the piezoelectric element 102. In this case, the inertia of the movable body 104 is incapable of overcoming the friction-fitting force between the movable body 104 and the vibration member 103. Therefore, the movable body 104 moves in the rightward direction, with the movement of the vibration member 103.

On the other hand, in a case of moving the movable body 104 in the leftward direction, the drive waveform shown in FIG. 9C is to be used. The drive waveform has a portion that rises gently and a portion that falls steeply. At the portion of where the drive waveform rises gently, the piezoelectric element 102 is elongated gently. In this case, the vibration member 103 moves slowly in the leftward direction with the gentle elongation of the piezoelectric element 102. In this case, the inertia of the movable body 104 is not capable of overcoming the friction-fitting force between the movable body 104 and the vibration member 103. Therefore, the movable body 104 moves in the leftward direction, with the movement of the vibration member 103.

Next, at the portion where the drive waveform raises steeply, as the inertia of the movable body 104 overcomes the friction-fitting force between the movable body 104 and the vibration member 103, as shown in FIG. 9B, the movable body 104 halts at that position without moving in the rightward direction.

By the plate spring 105 being pressed against the movable member 103 all the time, the movable body 104 is supported by the vibration member 103 by friction. Therefore, even when the movable body 104 is at halt, that position is maintained.

In such manner, the impact drive actuator is an actuator in which, the friction-fitting and inertia between the movable body 104 and the vibration member 103 are used, and is an actuator which is capable of moving the movable body 104 by using the drive waveforms shown in FIG. 9B and FIG. 9C.

CITATION LIST

Patent Literature

[Patent literature 1] Japanese Patent Application Laid-open Publication No. 2007-288828

SUMMARY OF THE INVENTION

The inertial drive actuator according to the present invention includes a displacement unit which causes a minute displacement in a first direction, and in a second direction which is opposite to the first direction, a vibration substrate which undergoes reciprocating movement due to the minute displacement caused by the displacement unit, a movable body which is disposed on a flat surface of the vibration substrate, a first magnetic field generator which generates a magnetic field so that, a magnetic attractive force or a magnetic repulsive force acts in a direction of the vibration substrate, opposite to the movable body, a first yoke which is included in the movable body, and which induces a magnetic flux generated by the first magnetic field generator such that, both of an N-pole (North pole) and an S-pole (South pole) of the magnetic flux generated by the first magnetic field generator are concentrated on a surface of the movable body, opposite to the vibration substrate, and a second yoke on a side of the vibration substrate, opposite to a direction facing the movable body, and the second yoke controls a frictional force acting between the movable body and the vibration substrate by controlling a magnetic field generated by the first magnetic field generator such that, both the N-pole and the S-pole of the magnetic flux generated by the first magnetic field generator are concentrated on a surface toward a fixed body, and drives the movable body.

Moreover, according to a preferable aspect of the present invention, it is desirable that the inertial drive actuator further includes a second magnetic field generator in addition to the first magnetic field generator, which generates a magnetic field so that, the magnetic attractive force or the magnetic repulsive force acts in a direction of the movable body, opposite to the vibration substrate, and the second yoke is disposed around the second magnetic field generator, for inducing a magnetic flux generated by the second magnetic field generator such that, an N-pole and an S-pole of the magnetic flux generated by the second magnetic field generator along with the first magnetic field generator are concentrated on a surface toward the fixed body, and the second yoke controls the frictional force acting between the movable body and the vibration substrate by controlling the magnetic field generated by at least one of the first magnetic field generator and the second magnetic field generator, and drives the movable body.

Moreover, according to another preferable aspect of the present invention, it is desirable that the first magnetic field generator is an electromagnetic coil.

According to still another preferable aspect of the present invention, it is desirable that the second magnetic field generator is a permanent magnet.

According to still another preferable aspect of the present invention, it is desirable that the displacement unit is a piezoelectric element.

According to still another preferable aspect of the present invention, it is desirable that the vibration substrate is a non-magnetic body.

According to still another preferable aspect of the present invention, it is desirable that the vibration substrate includes a non-magnetic portion and a magnetic portion.

According to still another preferable aspect of the present invention, it is desirable that at least a part of the vibration substrate includes the first magnetic field generator.

According to still another preferable aspect of the present invention, it is desirable that at least a part of the vibration substrate includes the second magnetic field generator.

According to still another preferable aspect of the present invention, it is desirable that the vibration substrate functions also as the second yoke.

According to still another preferable aspect of the present invention, it is desirable that the movable body includes a permanent magnet.

BRIEF DESCRIPTION OF DRAWINGS

FIG. 1A, FIG. 1B, and FIG. 10 are diagrams showing a structure of an inertial drive actuator according to a first embodiment of the present invention, where, FIG. 1A is a side view, FIG. 1B is a cross-sectional view, and FIG. 10 is a cross-sectional view of a modified example;

FIG. 2A is a side view, and FIG. 2B is a cross-sectional view;

FIG. 9A is a diagram showing an arrangement of the impact drive actuator, FIG. 9B is a diagram showing a drive waveform for moving a movable body to right, and FIG. 9C is a diagram showing a drive waveform for moving the movable body to left.

DETAILED DESCRIPTION OF THE INVENTION

An action and an effect due to an arrangement of an inertial drive actuator according to exemplary embodiments will be described below. However, the present invention is not restricted to the embodiments described below. In other words, the description of the embodiments includes specific contents in detail for the sake of exemplification, and variations and modifications made in the contents in detail are to be included in the scope of the present invention. Accordingly, the exemplary embodiments of the present invention below are described without loss of generality of the invention claimed, and without restricting the invention claimed.

First Embodiment

Figure 1A:
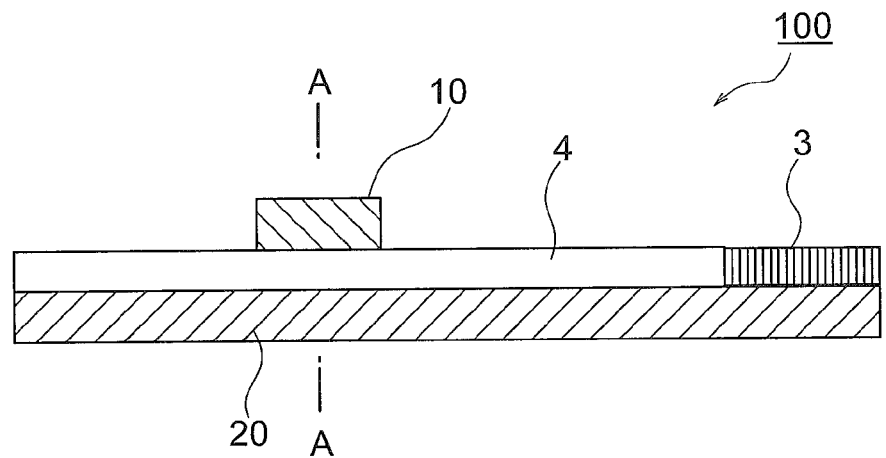
Figure 1B:
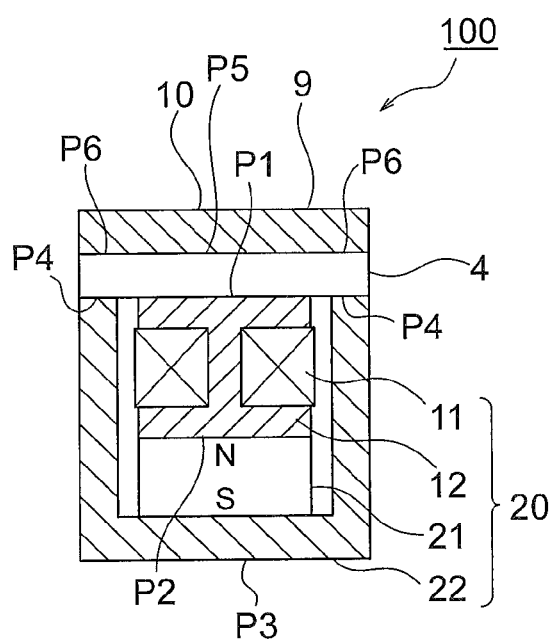
Figure 1C:
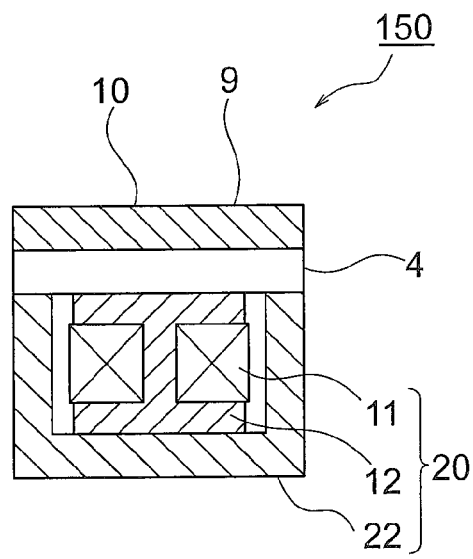

An inertial drive actuator 100 according to a first embodiment of the present invention is shown in FIG. 1A, FIG. 1B, and FIG. 1C. FIG. 1A is a side view of the inertial drive actuator and FIG. 1B is a cross-sectional view at a position indicated by A-A in FIG. 1A.

The inertial drive actuator 100 of the first embodiment includes a piezoelectric element (displacement unit) 3, a vibration substrate 4, a movable body 10, and a fixed body 20. The piezoelectric element 3 and the vibration substrate 4 are positioned on an upper portion of the fixed body 20, and the movable body 10 is positioned at an upper portion of the vibration plate 4. The movable body 10 has a function of a first yoke 9.

Both the piezoelectric element 3 and the vibration substrate 4 are members in the form of a plate. Here, a material of a non-magnetic body is used for the vibration substrate 4. One end of the piezoelectric element 3 and one end of the vibration substrate 4 are connected mechanically. However, an arrangement is not restricted to connecting mechanically, and the two may be connected by sticking. The piezoelectric element 3 and the vibration substrate 4 are placed on the upper portion of the fixed body 20. The piezoelectric element 3 generates a minute displacement, and the vibration substrate 4 undergoes a reciprocating movement due to the minute displacement caused by the piezoelectric element 3.

According to such arrangement, the piezoelectric element 3 (displacement means 3) generates minute displacement in a first direction, and in a second direction which is opposite to the first direction. Due to the minute displacement caused by the piezoelectric element 3, the vibration substrate 4 undergoes reciprocating movement. The movable body 10 is disposed on a flat surface of the vibration substrate 4.

In the cross-sectional view shown in FIG. 1B, a coil 11 (first magnetic field generator) which generates a magnetic field so that a magnetic attractive force or a magnetic repulsive force acts toward the fixed body 20 is provided in a direction of the vibration substrate 40, opposite to the movable body 10. The coil 11 is a coil such as an electromagnetic coil wound around a coil-core.

Moreover, second yokes 12 and 22 (magnetic flux inducing members) which induce a magnetic flux generated by the coil 11 are formed around the coil 11 such that, both of an N-pole and an S-pole of the magnetic flux generated by the coil 11 are concentrated. Here, a member for winding the coil 11 functions also as the second yoke 12.

The second yokes 12 and 22 control a frictional force acting between the movable body 10 and the vibration substrate 4 by controlling the magnetic field generated by the coil 11 such that, the N-pole and the S-pole of the magnetic flux generated by the coil 11 are concentrated on a surface (predetermined position) toward the fixed body 20, and drive the movable body 10.

According to such arrangement, since the coil 11 is provided toward the fixed body 20, there is no wire on the movable body 10. Therefore, a durability of wiring is improved and breaking of wire is prevented, thereby making it possible to carry out stable drive over a long period of time. Since the wire does not exist, it is possible to carry out stable drive without giving rise to any load, and therefore it is desirable.

It is possible to have an arrangement in which, a permanent magnet 21 (second magnetic field generator) which generates a magnetic field so that the magnetic attractive force or the magnetic repulsive force acts in a direction (on a side) of the vibration substrate 4, opposite to the movable body 10 is provided in addition to the coil 11 (first magnetic field generator).

The second yoke 22 is disposed with respect to the permanent magnet 21 (around second magnetic field generator) to induce the magnetic flux generated in the permanent magnet 21 (second magnetic field generator) such that both the N-pole and the S-pole of the magnetic flux generated in permanent magnet 21 (second magnetic field generator) along with the coil 11 (first magnetic field generator) are concentrated on a surface (predetermined position) toward the movable body 20.

Moreover, the frictional force acting between the movable body 10 and the vibration substrate 4 is controlled by controlling the magnetic field generated by at least one of the magnetic field generators namely the coil 11 (first magnetic field generator) and the permanent magnet 21 (second magnetic field generator), and the movable body 10 is driven.

The description will be made more concretely. As shown in FIG. 1B, fixed body 20 includes the coil 11, the second yokes (magnetic flux inducing members) 12 and 22, and furthermore, the permanent magnet 21 (second magnetic field generator). The permanent magnet 21 is a rectangular parallelepiped member of which, one of surface sides (upper-side surface) is an N-pole and the other surface side (lower-side surface) is an S-pole. Moreover, in the first embodiment, a length in a longitudinal direction of the coil 11 is almost same as a length in the longitudinal direction of the permanent magnet 21. The second yoke 22 is a box-shaped member. The permanent magnet 21 is placed at an inner side of the second yoke 22 with the surface on the N-pole side facing upward. The permanent magnet 21 is fixed to a bottom-surface portion of the second yoke 22. Accordingly, it is possible to show an effect of preventing leakage of the magnetic flux to an outside.

The coil 11 is fixed to the permanent magnet 21 (or the second yoke 22) all the time. Therefore, the coil 11 does not move with the movement of the movable body 10. Consequently, the wires connected to the coil 11 do not move.

In such manner, by providing the permanent magnet 21, a retaining force acts on the movable body 10 even when there is no electric current flowing through the coil 11. Therefore, it is possible to drive stably even when an overall system of the inertial drive actuator is inclined.

Modified Example of First Embodiment

Moreover, it is possible to let a cross-sectional arrangement as shown in FIG. 1C with respect to an arrangement shown in FIG. 1B. An inertial drive actuator 150 shown in FIG. 1C does not include the permanent magnet 21. Therefore, with respect to the vibration substrate 4, the movable body 10 is in a state of being placed by a gravitational force.

Next, an operation of the inertial drive actuator 100 will be described below. A driving principle (driving method) will be described by referring to FIG. 6.

In an arrangement such as one aforementioned, an electric current is passed through the coil 11 such that the N-pole is generated in an upward direction of a paper surface. As the electric current is passed through the coil 11, the N-pole is concentrated at an upper central portion P1 of the second yoke 12, and the S-pole is concentrated at a lower central portion P2 of the second yoke 12.

Here, the second yoke 22 is disposed on both sides of the coil 11. Therefore, it is possible to suppress the leakage of the magnetic flux generated by the coil 11, to the outside by the second yoke 22.

The N-pole is concentrated at a lower central portion P3 of the second yoke 22. The S-pole is concentrated at two upper end portions P4 of the second yoke 22.

Whereas, in the movable body 10, the S-pole, which is an opposite polarity, is induced at a central portion P5 of a first yoke 9. Moreover, the N-pole is concentrated at both end portions P6 of the movable body 10.

As a result, a strong magnetic adsorptive force is generated toward a lower side of the paper surface with respect to the movable body 10.

Here, the coil 11 and the permanent magnet 21 are in a state of being enclosed by the first yoke 9 and the second yoke 22. Therefore, it is possible to suppress the leakage of the magnetic flux generated by the coil 11 and the permanent magnet 21, to the outside by the first yoke 9 and the second yoke 22.

Whereas, counter to the abovementioned flux, in a case in which, an electric current is passed through the coil 11 such that the S-pole is concentrated at the upper central portion P1 of the second yoke 12, the magnetic adsorptive force decreases. Moreover, by changing the electric current passed through the coil 11, it is possible to change the strength of a normal force acting on the vibration substrate 4 of the movable body 10. By making such an arrangement, it is possible to control the frictional force between the movable body 10 and the vibration substrate 4.

In such manner, in the inertial drive actuator 100 of the first embodiment, it is possible to suppress the leakage of the magnetic flux of each of the movable body 10 and the fixed body 20 to the outside, and thereby to make the S-pole and the N-pole concentrate in a predetermined area. Accordingly, it is possible to generate the magnetic adsorptive force efficiently toward the lower side of the paper surface, between the movable body 10 and the fixed body 20.

As aforementioned, in the inertial drive actuator 100 of the first embodiment, the magnetic force is used for moving or driving the movable body 10. In other words, in the inertial drive actuator 100 of the first embodiment, a member such as an elastic body which wears away when the inertial drive actuator 100 is driven, has not been used. Therefore, even when the movable body 10 is moved or driven, it is not worn away. As a result, it is possible to move or to drive (to move to a desired position or to hold at a desired position) the movable body 10 stably over a long period of time. Moreover, in the inertial drive actuator 100 of the first embodiment, since the yoke is used, it is possible to suppress the leakage of the magnetic flux to the outside. Accordingly, it is possible to generate efficiently the magnetic adsorptive force or the magnetic repulsive force. Therefore, it is possible to move or to drive the movable body 10 efficiently while having a simple and low-cost arrangement.

Furthermore, as aforementioned, since no wire exists on the movable body 10, the durability of wiring is improved and breaking of wire is prevented, thereby making it possible to carry out stable drive over a long period of time. Moreover, since no wire exists, it is possible to carry out stable drive without giving rise to a load, and therefore it is desirable.

Modified Example

It is possible to let a cross-sectional arrangement as shown in FIG. 10 with respect to the arrangement shown in FIG. 1B. The inertial drive actuator 150 shown in FIG. 10 differs from the abovementioned inertial drive actuator 100 of the first embodiment at a point that the inertial drive actuator 150 does not include the permanent magnet 21. Therefore, the movable body 10 is in a state of being placed by the gravitational force with respect to the vibration substrate 4.

Second Embodiment

Next, an inertial drive actuator 200 according to a second embodiment of the present invention will be described below.

Figure 2A:
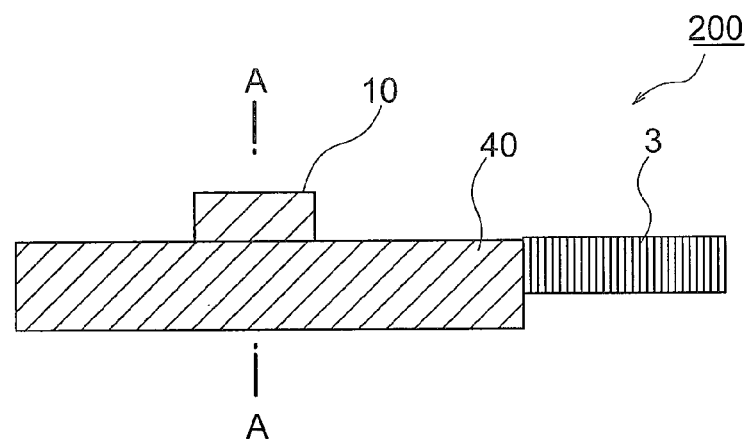
FIG. 2A and FIG. 2B are diagrams showing a structure of an inertial drive actuator according to a second embodiment of the present invention, where.
Figure 2B:
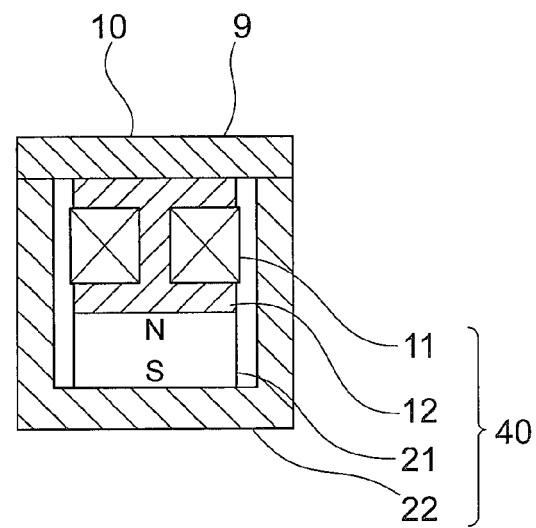

FIG. 2A is a side view of the inertial drive actuator 200, and FIG. 2B is a cross-sectional view at a position indicated by A-A in FIG. 2A. Same reference numerals are used for components which are same as in the inertial drive actuator 100 of the first embodiment, and description of such components is omitted.

The inertial drive actuator 200 of the second embodiment includes the piezoelectric element 3, the movable body 10, and a vibration substrate 40. The movable portion 10 is positioned on an upper portion of the vibration substrate 40. Moreover, one end of the piezoelectric element 3 and one end of the vibration substrate 40 are connected mechanically.

Details of an example of arrangement connecting the piezoelectric element 3 and the vibration substrate 40 will be described later.

The movable body 10 has a function of the first yoke 9. The structure of the movable body 10 being same as the structure of the movable body 10 of the first embodiment, the description thereof is omitted. Even the movable body 10 of the second embodiment functions similarly as the movable body 10 of the first embodiment.

Moreover, the vibration substrate 40 includes the permanent magnet 21, and the second yokes 12 and 22. The vibration substrate 40 functions similarly as the fixed body 20 of the first embodiment, and also functions as the vibration plate 4.

In the second embodiment, a point that inertial drive actuator 200 does not include the vibration substrate 4 of the first embodiment differs from the aforementioned first embodiment. Instead, the vibration substrate 40 includes the coil 11, the permanent magnet 21, and the second yokes 12 and 22. The vibration substrate 40 functions similarly as the fixed body of the first embodiment, and functions also as the vibration substrate 4.

Moreover, the coil 11 is disposed toward the vibration substrate 40. Therefore, as aforementioned, since no wire exists on the movable body 10, the durability of wiring is improved and breaking of wire is prevented, thereby making it possible to carry out stable drive over a long period of time. Moreover, since no wire exists, it is possible to carry out stable drive without giving rise to a load, and therefore it is desirable.

In such manner, since the inertial drive actuator 200 of the second embodiment includes members which carry out an action same as in the inertial drive actuator 100 of the first embodiment, the inertial drive actuator 200 shows an effect similar to the effect of the inertial drive actuator 100 of the first embodiment. Furthermore, in the inertial drive actuator 200 of the second embodiment, since the vibration substrate 40 is imparted the plurality of functions, small-sizing of the actuator is possible.

Figure 3A:
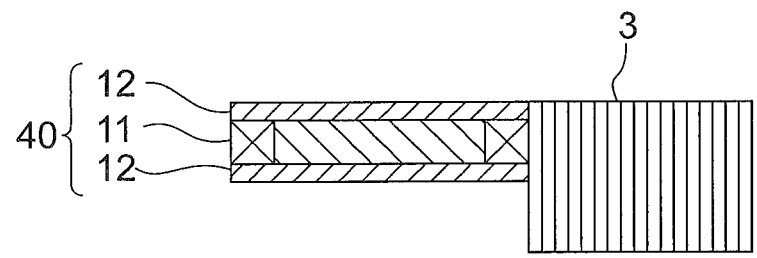
FIG. 3A, FIG. 3B, and FIG. 3C are diagrams showing an example for an arrangement of connecting a piezoelectric element and a vibration plate.
Figure 3B:
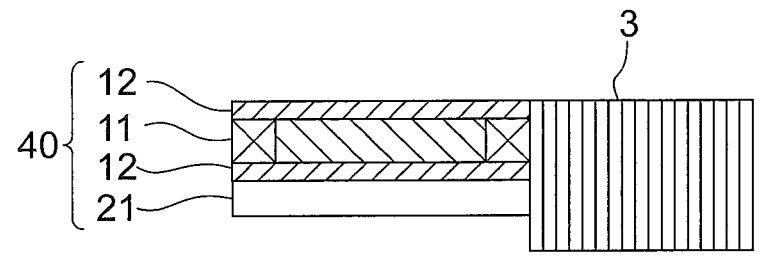
Figure 3C:
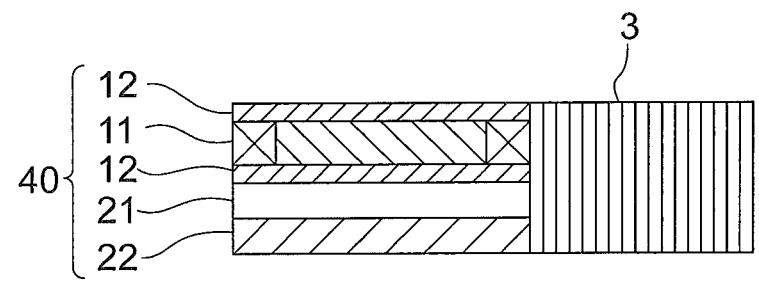

Next, an example of the arrangement for connecting the piezoelectric element 3 and the vibration substrate 40 in the second embodiment will be described below. FIG. 3A, FIG. 3B, and FIG. 3C show three different arrangements for connecting the piezoelectric element 3 and the vibration substrate 40. In FIG. 3A and FIG. 3B, a thickness of the piezoelectric element 3 and a thickness of the vibration substrate differ (the thickness of the piezoelectric element 3 is more than the thickness of the vibration substrate 40), and an arrangement may be made such that the thickness of the piezoelectric element 3 and the thickness of the vibration substrate 40 are same as in FIG. 3C.

FIG. 3A is an arrangement in which, only the coil 11 is connected to and vibrates with the piezoelectric element 3. In other words, the arrangement is such that at least a part of the vibration substrate 40 includes the coil 11 (first electric field generator). Accordingly, the vibration substrate 40 being the coil 11, it is possible to make the arrangement simple.

FIG. 3B is an arrangement in which, the coil 11 and the permanent magnet 21 are connected to and vibrate with the piezoelectric element 3. Here, an arrangement may be such that only the piezoelectric element 3 and the permanent magnet 21 are connected and vibrate. Accordingly, it is possible to maintain the movable body 10 with a constant magnetic attractive force all the time.

FIG. 3C is an arrangement in which, the coil 11, the permanent magnet 21, and the second yoke 22 are connected to and vibrate with the piezoelectric element 3. Accordingly, as the yoke is used, it is possible to suppress the leakage of the magnetic flux to the outside. Consequently, it is possible to generate efficiently the magnetic adsorptive force and the magnetic repulsive force. Therefore, it is possible to move or to drive the movable body 10 efficiently while having a simple and low-cost arrangement.

As a further effect of the arrangement in FIG. 3C, comparing with the abovementioned arrangements in FIG. 3A and FIG. 3B at the time of vibration, since all the members are made to vibrate, there being no adsorptive force of magnet acting vertically with respect to a direction of vibration, the piezoelectric element 3 is capable of making the coil 11, the permanent magnet 21, and the second yoke 22 vibrate with a small force.

Here, an arrangement may be an arrangement in which, only the piezoelectric element 3 and the second yoke 22 are connected, or an arrangement in which, only the piezoelectric element 3, the second yoke 22, and the coil 11 are connected, or an arrangement in which, only the piezoelectric element 3, the second yoke 22, and the permanent magnet 21 are connected and vibrate.

An action and an effect of the second embodiment will be described below. In the inertial drive actuator 200, the magnetic force is used for moving or driving the movable body 10. In other words, in the inertial drive actuator 100 of the first embodiment, no member such as an elastic body which is worn away when driven has been used. Therefore, it is possible to move or to drive (to move to a desired position or to hold at a desired position) the movable body 10 stably over a long period of time. Moreover, in the inertial drive actuator 100 of the first embodiment, since the yoke is used, it is possible to suppress the leakage of the magnetic flux to the outside. Accordingly, it is possible to generate efficiently the magnetic adsorptive force or the magnetic repulsive force. Therefore, it is possible to move or to drive the movable body efficiently while having a simple and low-cost arrangement.

Third Embodiment

Next, an inertial drive actuator 300 according to a third embodiment of the present invention will be described below.

Figure 4:
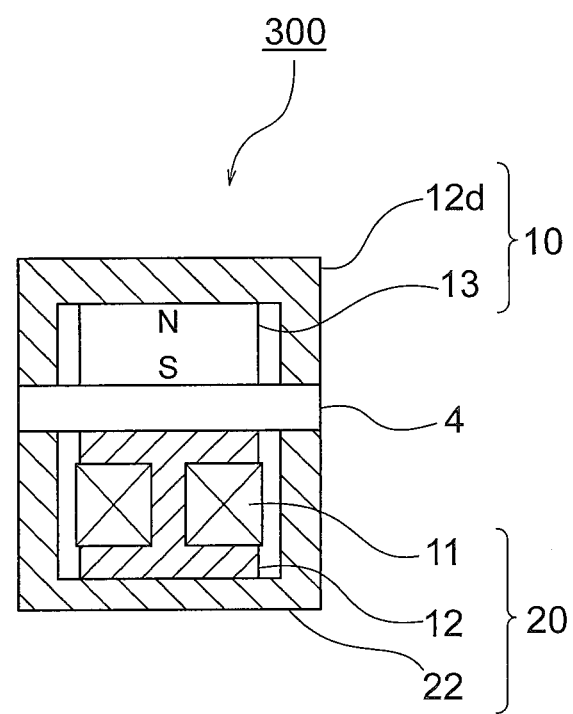
FIG. 4 is a cross-sectional view of an inertial drive actuator according to a third embodiment of the present invention.

FIG. 4 is a cross-sectional view of the inertial drive actuator 300, similar to FIG. 1B. Same reference numerals are used for components which are same as in the inertial drive actuator 100 of the first embodiment, and description of such components is omitted.

The inertial drive actuator 300 of the third embodiment includes the piezoelectric element 3 (not shown in the diagram), the vibration substrate 4, the movable body 10, and the fixed body 20. The piezoelectric element 3 and the vibration substrate 4 are positioned at an upper portion of the fixed body 20, and the movable body 10 is positioned at an upper portion of the vibration substrate 4.

The movable body 10 includes a first yoke 12d and a permanent magnet 13. In other words, the movable body 10 includes the permanent magnet 13.

Whereas, the fixed body 20 includes the coil 11 and the second yokes 12 and 22.

The third embodiment differs from the first embodiment at a point that the permanent magnet 13 is provided toward the movable body 10.

In such manner, by providing the permanent magnet 13, the retaining force acts on the movable body 10 all the time even when no electric current is passed through the coil 11. Therefore, it is possible to drive stably even when an overall system of the inertial drive actuator is inclined.

Even in the third embodiment, the coil 11 is provided toward the fixed body 20. Therefore, the durability of wiring is improved and breaking of wire is prevented, thereby making it possible to carry out stable drive over a long period of time.

Fourth Embodiment

Next, an inertial drive actuator 400 according to a fourth embodiment of the present invention will be described below.

Figure 5:
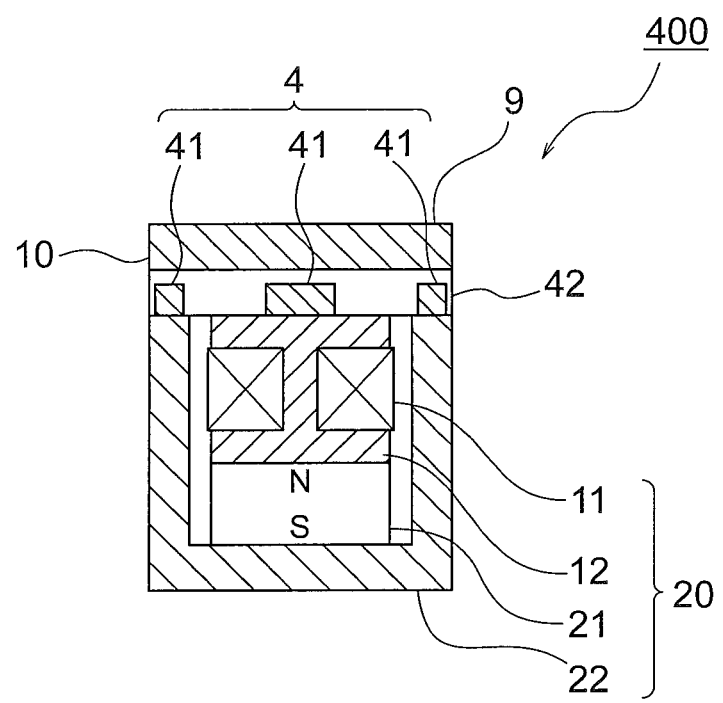
FIG. 5 is a cross-sectional view of an inertial drive actuator according to a fourth embodiment of the present invention.

FIG. 5 is a cross-sectional view of the inertial drive actuator 400, similar to FIG. 1B. Same reference numerals are used for components which are same as in the inertial drive actuator 100 of the first embodiment, and description of such components is omitted.

The inertial drive actuator 400 of the fourth embodiment includes the piezoelectric element 3 (not shown in the diagram), the vibration substrate 4, the movable body 10, and the fixed body 20. The piezoelectric element 3 and the vibration substrate 4 are positioned at an upper portion of the fixed body 20. The movable body 10 is positioned at an upper portion of the vibration substrate 4.

In the inertial drive actuator 400 of the fourth embodiment and the inertial drive actuator 100 of the first embodiment, the structure of the vibration substrate differs. The vibration substrate 4 of the first embodiment includes only the non-magnetic body.

Whereas, the vibration substrate 4 of the fourth embodiment includes a magnetic body portion 41 and a non-magnetic body portion 42. The magnetic body portion 41 functions as a yoke. The magnetic body portion 41 is divided into three portions, with one portion disposed at a center of the vibration substrate 4, and the two portions disposed on two sides sandwiching the center. A position of the magnetic body portion 41 at the center is a position almost facing the second yoke 12. Moreover, positions of the magnetic body portions 41 on two sides are positions almost facing the ends of the second yoke 12.

In the inertial drive actuator 400 of the fourth embodiment, since the magnetic flux induced by the first yoke 9 of the movable body 10 and the magnetic flux induced by the second yokes 12 and 22 of the fixed body 20 flow via the vibration substrate 4 and the magnetic body portion 41 respectively, there is an effect of suppressing further the leakage of magnetic flux. Particularly, at upper portions of two ends of the second yoke 22, since the magnetic body portions 41 of two sides exist in between the two, it is possible to suppress substantially the leakage of the magnetic flux to the outside from in between the two.

Moreover, even in the fourth embodiment, the coil 11 is provided toward the fixed body 20. Therefore, the durability of wiring is improved and breaking of wire is prevented, thereby making it possible to carry out stable drive over a long period of time.

Next, a driving method for driving the abovementioned inertial drive actuator 100 will be described below.

Figure 6:
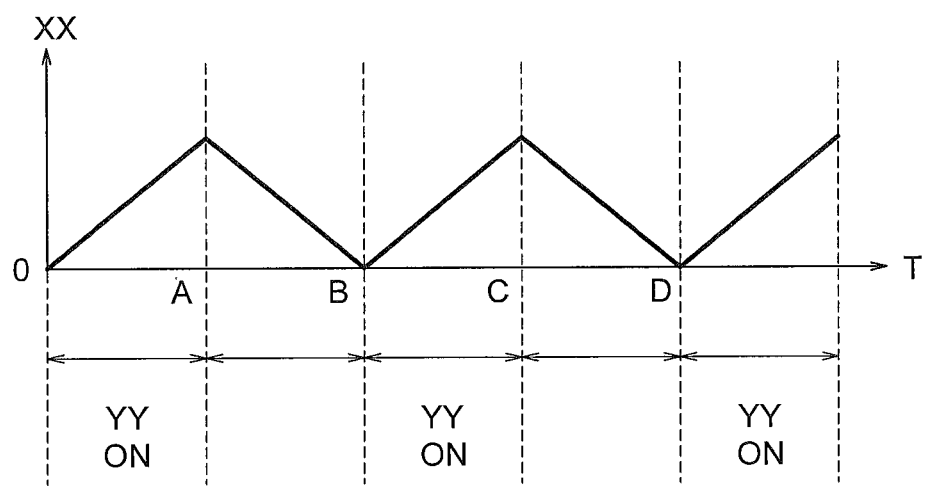
FIG. 6 is a diagram showing a driving method for driving the inertial drive actuator according to the first embodiment.

FIG. 6 shows the driving method for driving the inertial drive actuator 100 of the first embodiment. In FIG. 6, a horizontal axis indicates time T and a vertical axis indicates displacement XX of the piezoelectric element 3. In FIG. 1A, a case in which, the piezoelectric element 3 has been elongated in a leftward direction of the paper surface is let to be positive.

Moreover, the magnetic adsorption is indicated by YY. For reference numerals such as time T in the diagram, same reference numerals are used in FIG. 8 and FIG. 9.

During a period from time 0 to A, the piezoelectric element 3 is elongated. During this period, the electric current is passed through the coil 11 such that the N-pole is generated in the upward direction of the paper surface in the coil 11. As the N-pole is generated in the coil 11, the magnetic adsorptive force acting toward the vibration substrate 4 in the movable body 10, increases. Therefore, the friction between the movable body 10 and the vibration substrate 4 increases. As a result, with the elongation of the piezoelectric element 3, the vibration substrate 4 moves toward the leftward direction of the paper surface, and the movable body 10 also moves together in the leftward direction of the paper surface.

Next, during a period from time A to time B, the piezoelectric element 3 contracts. During this period, the passing of the electric current to the coil 11 is stopped. As the passing of the electric current to the coil 11 is stopped, magnetic adsorptive force generated by the coil 11 ceases to act on the movable body 11. Therefore, the frictional force between the movable body 10 and the vibration substrate 4 decreases. This means that am amount of sliding of the movable body 10 with respect to the vibration plate 4 has increased. As a result, even when the vibration substrate 4 moves in the rightward direction of the paper surface with the contraction of the piezoelectric element 3, apparently, the movable body 10 assumes a state of having come to rest at a position to which it has moved. In such manner, since the movable body 10 slides in the leftward direction with respect to the vibration substrate 4 which moves in the rightward direction of the paper surface along with the contraction of the piezoelectric element 3, during a period from time 0 to time B, the movable body 10 moves in the leftward direction of the paper surface. By repeating the same operation during a period from time B to time C, and a period from time C to time D, it is possible to continue to move the movable body 10 in the leftward direction of the paper surface.

It is possible to move the movable body 10 in the rightward direction of the paper surface by reversing the timing of passing the electric current through the coil 11 as shown in FIG. 6. In other words, instead of passing the electric current through the coil 11 during the period from time 0 to time A (while the vibration substrate 4 elongates), the electric current is passed through the coil 11 such that the N-pole is generated in the upward direction of the paper surface, during the period from time A to time B (while the vibration substrate 4 contracts). By doing so, it is possible to move the movable body 10 in the rightward direction of the paper surface.

In the example of moving rightward, the passing current through the coil 11 is stopped during the period from time A to time B. Instead, the electric current may be passed through the coil 11 such that the magnetic repulsive force acts toward the vibration substrate 4 on the movable body 10 (or such that the magnetic adsorptive force decreases). By doing so, it is possible to move the movable body 10 in the leftward direction of the paper surface.

As aforementioned, in a case of not passing the electric current through the coil 11, the frictional force between the movable body 10 and the vibration substrate 4 decreases, and as a result, an arrangement is made such that, even when the vibration substrate 4 moves in the rightward direction of the paper surface, apparently, the movable body 10 assumes a state of having come to rest at the position to which it has moved. However, if specifications (such as mass, weight, and length) of the movable body 10 (first yoke 9), the coil 11, the second yoke 12, and the permanent magnet 13 are selected appropriately, even in a case of not passing the electric current through the coil 11, it is possible to maintain the frictional force between the movable body 10 and the vibration substrate 4 to certain degree.

Therefore, if an arrangement is made such that no electric current is passed through the coil during the period from time 0 to time A, it is possible to move the vibration substrate 4 in the leftward direction of the paper surface with the elongation of the piezoelectric element 3. Moreover, an arrangement is made such that, during the period from time A to time B, the electric current is passed through the coil 11 such that the magnetic repulsive force acts toward the vibration substrate 4 on the movable body 10. Even when such an arrangement is made, it is possible to continue to move the movable body 10 in the leftward direction of the paper surface.

Moreover, in a case of driving the inertial drive actuator 150 of the modified example of the first embodiment, the following arrangement is made. During the period from 0 to time A, the electric current is passed through the coil 11 such that the N-pole is generated in the upward direction of the paper surface. As the electric current is passed through the coil 11, the friction between the movable body 10 and the vibration substrate 4, increases. As a result, the vibration substrate 4 moves in the leftward direction of the paper surface, with the elongation of the piezoelectric element 3, the movable body 10 moves in the leftward direction of the paper surface, with the movement of the vibration substrate 4.

Next, during the period from time A to time B, the passing of the electric current to the coil 11 is stopped. As the passing of the electric current to the coil 11 is stopped, the friction between the movable body 10 and the vibration substrate 4 decreases. As a result, even when the vibration substrate 4 moves in the rightward direction of the paper surface with the contraction of the piezoelectric element 3, apparently, the movable body 10 assumes a state of having come to rest at the position to which it has moved. By doing so, it is possible to move the movable body 10 in the leftward direction of the paper surface.

It is needless to mention that it is possible to move the movable body 10 in the rightward direction of the paper surface by changing the timing of passing the electric current through the coil 11 as aforementioned. Moreover, even by reversing the direction of passing the current through the coil 11, it is possible to move the movable body 10.

Fifth Embodiment

Next, an inertial drive actuator 500 according to a fifth embodiment of the present invention will be described below.

Figure 7A:
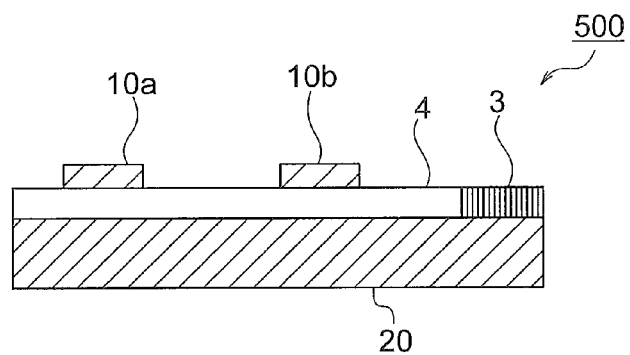
FIG. 7A, FIG. 7B, and FIG. 7C are side views showing a structure of an inertial drive actuator according to a fifth embodiment of the present invention.
Figure 7B:
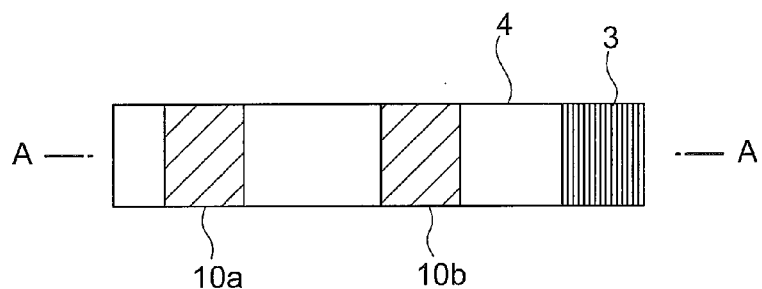
Figure 7C:
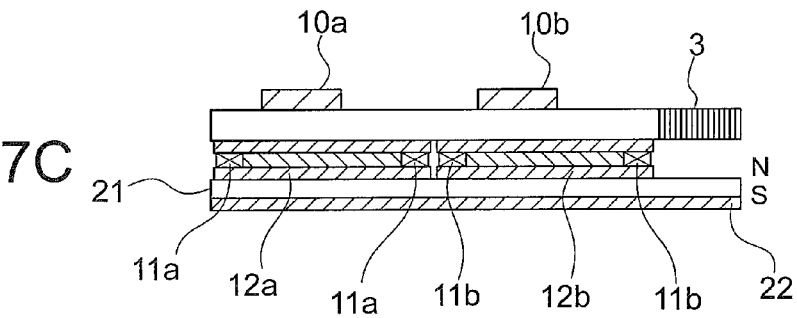
Figure 8A:
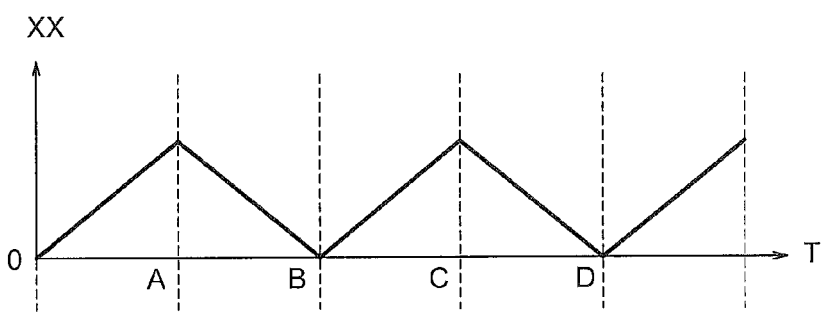
FIG. 8A, FIG. 8B, and FIG. 8C are diagrams showing a driving method for driving the inertial drive actuator according to the fifth embodiment.
Figure 8B:
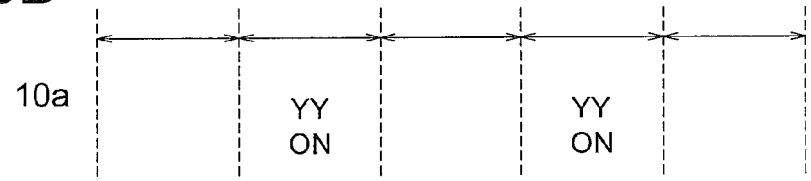
Figure 8C:
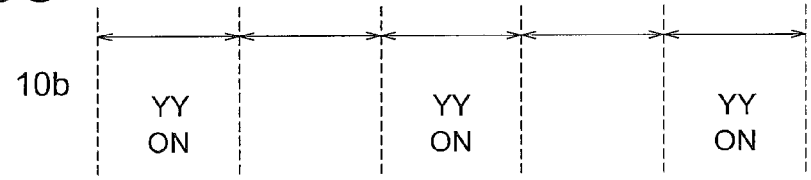
Figure 9A:
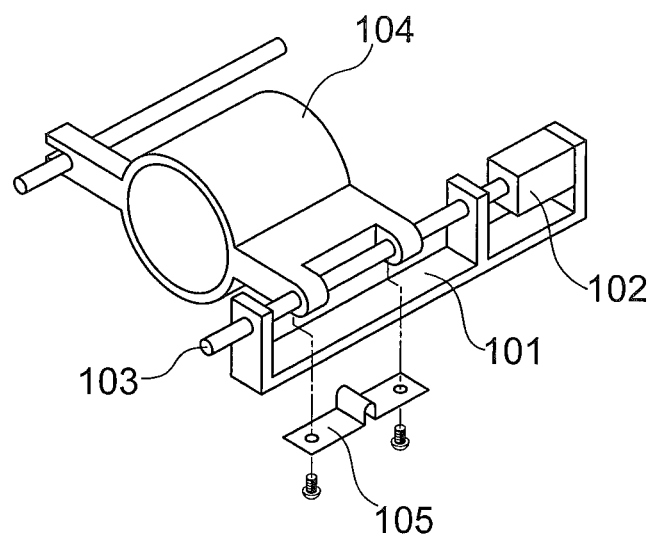
FIG. 9A, FIG. 9B, and FIG. 9C are diagrams showing a conventional impact drive actuator, where.
Figure 9B:
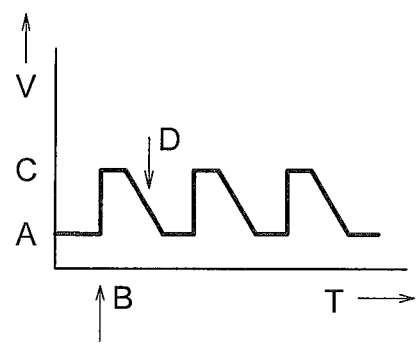
Figure 9C:
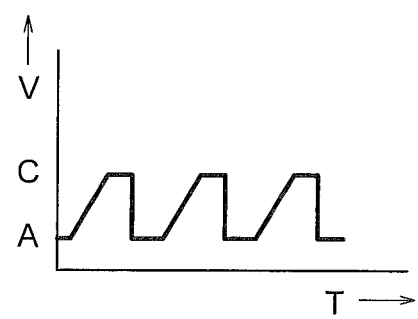

FIG. 7A is a side view of the inertial drive actuator 500, FIG. 7B is a top view of the inertial drive actuator 500, and FIG. 7C is a cross-sectional view of the inertial drive actuator 500. FIG. 8A, FIG. 8B, and FIG. 8C show a driving method for driving the inertial drive actuator 500 of the fifth embodiment.

The inertial drive actuator 500 of the fifth embodiment includes two movable bodies 10 in the inertial drive actuator 100 of the first embodiment. In other words, the inertial drive actuator 500 of the fifth embodiment includes the piezoelectric element 3, the vibration substrate 4, a movable body 10a, a movable body 10b, and the fixed body 20. The piezoelectric element 3 and the vibration substrate 4 are positioned at an upper portion of the fixed body 20, and the movable body 10a and the movable body 10b are positioned at an upper portion of the vibration substrate 4.

The driving method for driving the inertial drive actuator 500 will be described below. In FIG. 8A, FIG. 8B, and FIG. 8C, a horizontal axis indicates time, and a vertical axis indicates displacement of the piezoelectric element 3. In FIG. 7A, FIG. 7B, and FIG. 7C, a case in which, the piezoelectric element 3 has been elongated in the leftward direction of the paper surface is let to be positive.

As shown in the cross-sectional view in FIG. 7C, in the fifth embodiment, in a range in which the movable body 10a moves, a coil 11a is provided toward the fixed body 20. Similarly, in a range in which, the movable body 10b moves, a coil 11b is provided toward the fixed body 20h. In other words, a coil corresponding to each movable body is necessary.

The coil 11a is used for changing attraction of the movable body 10a. The coil 11b is used for changing attraction of the movable body 10b.

During a period from time 0 to time A, the piezoelectric element 3 elongates. During this period, no electric current is passed through the coil 11a of the movable body 10a. In this case, the magnetic adsorptive force ceases to act on the movable body 10a. Therefore, the movable body 10a is stationary as it has been, without changing the position. Whereas, the current is passed through the coil 11b of the movable body 10b such that the N-pole is generated in the upward direction of the paper surface. In this case, the magnetic adsorptive force acts toward the vibration substrate 4 on the movable body 10b as shown in FIG. 6. Therefore, the movable body 10b moves in the leftward direction of the paper surface.

Next, during a period from time A to time B, the piezoelectric element 3 contracts. During this period, the electric current is passed through the coil 11a of the movable body 10a such that the magnetic adsorptive force toward the vibration substrate 4 acts on the movable body 10a. Therefore, the movable body 10a moves in the rightward direction of the paper surface. On the other hand, no electric current is passed through the coil 11b of the movable body 10b. In this case, the magnetic adsorptive force ceases to act on the movable body 10b. Therefore, the movable body 10b is stationary as it has been, without changing the position.

As aforementioned, during the period from time 0 to time A, the movable body 10a is stationary, and the movable body 10b moves in the leftward direction of the paper surface, or in other words, moves toward the movable body 10a. Whereas, during a period from time A to time B, the movable body 10a moves in the rightward direction of the paper surface, or in other words, moves toward the movable body 10b, and the movably body 10b is stationary. As a result, it is possible to bring the movable body 10a and the movable body 10b closer. Moreover, it is possible to bring the movable body 10a and the movable body 10b even closer by repeating the driving method during a period from time 0 to time B. Furthermore, if the driving method is changed, it is possible to move the movable body 10a and the movable body 10b in the same direction, or to separate apart the movable body 10a and the movable body 10b.

In FIG. 7A, FIG. 7B, and FIG. 7C, and FIG. 8A, FIG. 8B, and FIG. 8C, an arrangement of two movable bodies and the driving method thereof have been illustrated for explaining. In principle, even for two or more than two movable bodies, it is possible to drive each body independently on the same vibration substrate.

Moreover, even in the fifth embodiment, since the coil 11 is provided toward the fixed body 20, no wire exists on the movable body 10. Therefore, the durability of wiring is improved and breaking of wire is prevented, thereby making it possible to drive stably over a long period of time. Moreover, since no wire exists, it is possible to carry out stable drive without giving rise to any load, and therefore it is desirable.

The present invention can take various modified examples without departing from the scope of the invention.

As aforementioned, the present invention is suitable for an inertial drive actuator which is capable of carrying out a stable operation over a long period of time, such as moving the movable body to a desired position, bringing the body at rest at a desired position, and maintaining the state of being at rest.

According to the present invention, it is possible to provide an inertial drive actuator which is capable of reducing an effect of factors such as wearing away, by using a magnetic force, and which is further capable of moving or driving a movable body efficiently by using a yoke, and in which, the durability of wiring is improved and breaking of wire is prevented, thereby making it possible to carry out stable drive over a long period of time.

What is claim is:

1. An inertial drive actuator comprising:
   a displacement unit which causes a minute displacement in a first direction and in a second direction, the second direction being opposite to the first direction;
   a vibration substrate which undergoes a reciprocating movement due to the minute displacement caused by the displacement unit;
   a movable body disposed on a surface of the vibration substrate;
   a first magnetic field generator disposed on a side of the vibration substrate opposite to the surface of the vibration substrate on which the movable body is disposed, the first magnetic field generator generating a magnetic field so that, a magnetic attractive force or a magnetic repulsive force acts in a direction of the vibration substrate;
   a first yoke which constitutes at least a part of the movable body, and which induces a magnetic flux generated by the first magnetic field generator; and
   a second yoke disposed on a side of the vibration substrate, opposite to a direction facing the movable body,
   wherein the second yoke is formed around the first magnetic field generator and is configured to guide magnetic flux generated by the first magnetic field generator such that the magnetic flux generated by the first magnetic field generator concentrates on the side opposite to the surface of the vibration substrate with respect to both an S-pole and an N-pole, and to induce the magnetic flux towards the first yoke, and
   the second yoke controls a frictional force acting between the movable body and the vibration substrate by controlling a magnetic field generated by the first electric field generator such that, both the N-pole and the S-pole of the magnetic flux generated by the first magnetic field generator are concentrated on a surface toward a fixed body, and drives the movable body.

2. An inertial drive actuator comprising:
   a displacement unit which causes a minute displacement in a first direction, and in a second direction, the second direction being opposite to the first direction;
   a vibration substrate which undergoes a reciprocating movement due to the minute displacement caused by the displacement unit;
   a movable body disposed on a surface of the vibration substrate;
   a first magnetic field generator which generates a magnetic field so that a magnetic attractive force or a magnetic repulsive force acts in a direction of the vibration substrate, opposite to the movable body;
   a first yoke included in the movable body, the first yoke inducing a magnetic flux generated by the first magnetic field generator such that, both of an N-pole and an S-pole of the magnetic flux generated by the first magnetic field generator are concentrated on a surface of the movable body, opposite to the vibration substrate;
   a second yoke which is disposed on a side of the vibration substrate, opposite to a direction facing the movable body; and
   a second magnetic field generator in addition to the first magnetic field generator, which generates a magnetic field so that, the magnetic attractive force or the magnetic repulsive force acts in a direction of the movable body, opposite to the vibration substrate, wherein the second yoke controls a magnetic field generated by the first electric field generator such that, both the N-pole and the S-pole of the magnetic flux generated by the first magnetic field generator are concentrated on a surface toward a fixed body, the second yoke is disposed around the second magnetic field generator, for inducing a magnetic flux generated by the second magnetic field generator such that, an N-pole and an S-pole of the magnetic flux generated by the second magnetic field generator along with the first magnetic field generator are concentrated on a surface toward the fixed body, and the second yoke controls the frictional force acting between the movable body and the vibration substrate by controlling the magnetic field generated by at least one of the first magnetic field generator and the second magnetic field generator, and drives the movable body.

3. The inertial drive actuator according to claim 1, wherein the first magnetic field generator is an electromagnetic coil.

4. The inertial drive actuator according to claim 2, wherein the second magnetic field generator is a permanent magnet.

5. The inertial drive actuator according to claim 1, wherein the displacement unit is a piezoelectric element.

6. The inertial drive actuator according to claim 1, wherein the vibration substrate is a non-magnetic body.

7. The inertial drive actuator according to claim 1, wherein the vibration substrate includes a non-magnetic portion and a magnetic portion.

8. The inertial drive actuator according to claim 2, wherein at least a part of the vibration substrate includes the first magnetic field generator.

9. The inertial drive actuator according to claim 2, wherein at least a part of the vibration substrate includes the second magnetic field generator.

10. The inertial drive actuator according to claim 1, wherein the vibration substrate functions also as the second yoke.

11. The inertial drive actuator according to claim 1, wherein the movable body includes a permanent magnet.

* * * * *